United States Patent [19]
Chang et al.

[11] 3,860,884
[45] Jan. 14, 1975

[54] OPTICALLY PUMPED LASER USING $N_2O$ OR SIMILAR GAS MIXED WITH ENERGY-TRANSFERRING $CO_2$

[75] Inventors: Tao-Yuan Chang, Middletown; Obert Reeves Wood, II, Holmdel, both of N.J.

[73] Assignee: Bell Telephone Laboratories Incorporated, Murray Hill, N.J.

[22] Filed: Oct. 10, 1973

[21] Appl. No.: 405,016

[52] U.S. Cl. .......................................... 331/94.5 G
[51] Int. Cl. .............................................. H01s 3/22
[58] Field of Search ..................... 331/94.5; 252/372

[56] References Cited
UNITED STATES PATENTS
3,790,898  2/1974  Gudmundsen et al. ......... 331/94.5 C

*Primary Examiner*—William L. Sikes
*Attorney, Agent, or Firm*—Wilford L. Wisner

[57] ABSTRACT

There is described a powerful excitation technique for a mixture of molecular gases in which a combination of optical pumping and resonant energy transfer is used. An optically-pumped $N_2O$ laser pumped at 4.3 $\mu$m by HBr laser is "seeded" with a minor portion of $CO_2$, which absorbs the pumping radiation and transfers it by vibration-vibration energy transfer to invert the populations of the 00°1 and 10° levels of the $N_2O$. In this laser oscillations have been achieved at 10.5 $\mu$m at total pressure up to 42 atmospheres, which is more than an order of magnitude greater than feasible in an optically-pumped $N_2O$ laser without $CO_2$. The advantages of broad tunability and short pulse width are obtainable. In addition, a rare isotope $CO_2$ laser employs $C^{13}O_2^{16}$ to comprise at least 90 percent and possibly as much as 97 percent of the gas mixture, together with as little as 3 percent of ordinary $CO_2$ ($C^{12}O_2^{16}$). Only the ordinary $CO_2$ absorbs a significant portion of the pumping radiation directly; but significant energy transfer occurs by collision from the ordinary $CO_2$ to the $C^{13}O_2^{16}$. Laser oscillation is thereby obtainable between about 9 $\mu$m and 11 $\mu$m, for a total pressure exceeding about 40 atmospheres.

10 Claims, 7 Drawing Figures

OPTICALLY PUMPED LASER USING N₂O OR SIMILAR GAS MIXED WITH ENERGY-TRANSFERRING CO₂

BACKGROUND OF THE INVENTION

This invention relates to optically-pumped lasers that are capable of broad tunability and short pulse operation in the infrared portion of the spectrum.

Recently it has been appreciated that the molecular gas lasers such as the carbon dioxide laser operating near 10 $\mu$m in the infrared are capable of oscillating on so many different lines that many desirable characteristics could be obtained if the lines could be forced to broaden until overlapping. Increased pressure is one way to obtain such broadening. As pointed out in our co-pending patent application Ser. No. 250,976 filed May 8, 1972 and assigned to the assignee hereof, this result can be obtained without disintegrating the gas molecules in the relatively stronger discharge needed in the active medium at increased gas pressure, specifically, by substituting optical pumping for electrical excitation and elevating the pressure of the medium to very high pressure at which other forms of pumping are not feasible. It was discovered to be very advantageous to use a transverse-excitation hydrogen bromide laser to pump the molecular gas at about 4.3 $\mu$m.

While that technique has fairly broad applicability without further major innovation, there are some molecular gases in which direct absorption from the hydrogen bromide laser radiation no longer occurs sufficiently strongly as the pressure is elevated until the individual laser lines merge. For example, pure molecular gas N₂O will oscillate only up to a maximum operating pressure of about 7.5 atmospheres in response to optical pumping by the hydrogen bromide laser.

SUMMARY OF THE INVENTION

We have discovered that the pressure of the laser medium can be elevated significantly in N₂O or other selected media such as $C^{13}O_2^{16}$, or the laser medium can be used in liquid or solid form, when it is seeded with a minor portion of CO₂ and pumped at 4.3 $\mu$m by the hydrogen bromide laser. The minor portion of CO₂ absorbs the pumping radiation and transfers it by vibration-vibration energy transfer to invert the populations of the upper and lower laser levels of the N₂O. Because of the addition of the CO₂, the N₂O laser can now operate at pressures up to 42 atmospheres or in such a state liquid or solid, as to afford broad tunability and short pulse width.

BRIEF DESCRIPTION OF THE DRAWING

Further features and advantages of our invention will become apparent from the following detailed description, taken together with the drawing, in which.

DESCRIPTION OF ILLUSTRATIVE EMBODIMENTS

Figure 1:
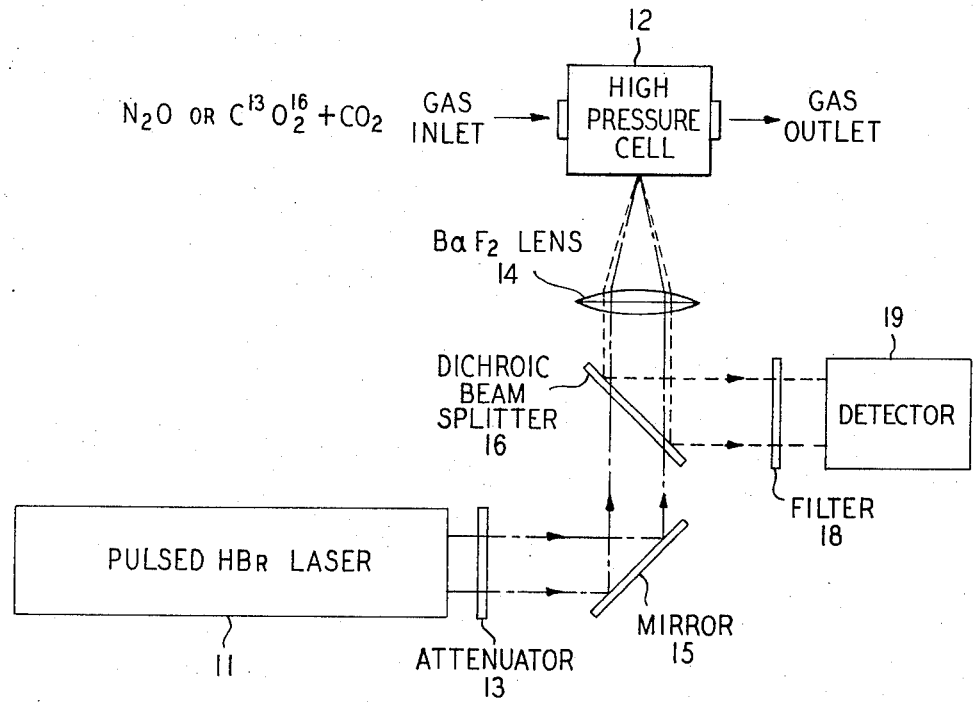
FIG. 1 is a partially pictorial and partially block diagrammatic illustration of an experimental embodiment of our invention.

In the experimental laser arrangement of FIG. 1, it is desired to obtain laser action in a relatively small quantity of a dense molecular medium in a cell 12 in response to optical pumping by a pulsed hydrogen bromide laser 11 oscillating at about 4.3 $\mu$m, which is in the typical absorption band for most potentially infrared-emissive gas molecules.

The arrangement further provides that the light from laser 11, which may be of the transverse-excitation type, is attenuated to the desired level by attenuator 13 and directed by mirror 15 through the dichroic beam splitter 16 and the focusing lens 14, typically of barium fluoride (BaF₂), to cell 12. Lens 14 also serves to collect the output coherent radiation of cell 12 and direct it toward beam splitter 16 from which it is reflected through the output filter 18 into detector 19. Filter 18 is adapted to remove all residual pumping radiation. Detector 19 could be replaced by any desired utilization apparatus for the output coherent light, which will generally be of a wavelength or band of wavelengths between about 9 $\mu$m and about 11 $\mu$m.

Figure 1A:
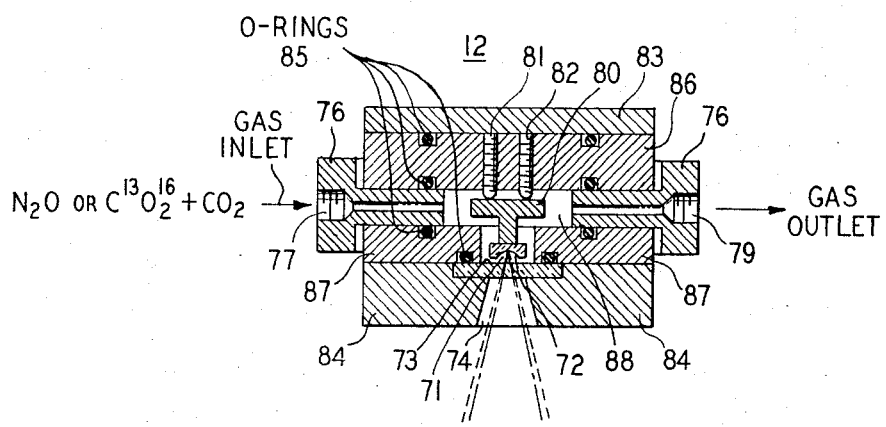
FIG. 1A shows further details of the optically pumped laser cell of FIG. 1.

FIG. 1A shows the structure of cell 12 which facilitates a relatively dense molecular medium to be introduced and utilized for laser action. Illustratively, a gas mixture of nitrous oxide (N₂O) and CO₂ is introduced into the gas inlet 77 from appropriate pressurized sources (not shown) in a proportion determined by a mixing valve (not shown). Such details are conventional; as is also the structure of the outlet duct beyond duct 79 so that it also may be closed off to maintain an elevated pressure.

Of more interest for the present invention is the fact that cell 12 is constructed in a general cylindrical form of a plurality of heavy metallic members, all cylindrical in shape, which are sealed by conventional O-rings 85. The central gas chamber 88 communicates with inlet duct 77 formed in the cylindrical body 76 and with the outlet duct 79 in the opposite side of body 76. Over the reduced thickness central portion of body 76, two additional cylindrical members 86 and 87 are placed with recesses containing two of the O-rings 85 at the juncture to provide a suitable seal. Member 86 admits the mirror-adjusting screws 81 and 82 which control the orientation of the curved reflector 72 which is mounted on mirror mount 80. It will be noticed that mirror 72 is offset from the main gas flowpath to be within a hollow 71 within member 87. That hollow is sealed at the outer surface of member 87 by the opposed end reflector 73 which is illustratively planar. On the back of both members 86 and 87 and end reflectors 73 are the cover plates 83 and 84 to which opposed axial forces are applied by conventional clamping means not shown to seal the entire structure tightly together. Cover plate 84 has a conical central opening which passes both the pumping radiation and the output coherent radiation.

The foregoing structure is believed capable of sustaining gas pressures up to about 100 atmospheres.

There is illustratively admitted to cell 12 of FIG. 1 a mixture of $N_2O$ and $CO_2$, the proportion of $N_2O$ being about 90 to 99 percent and the proportion of $CO_2$ being from about 1 to 10 percent. Total pressures from about 1 to 42 atmospheres were utilized; but the more desirable results were achieved at relatively elevated pressures, greater than 10 atmospheres, within that range. The reflector 72 was aligned with reflector 73 while a gas pressure of about 1 atmosphere was in cell 12, since it was necessary to remove cover plate 83 to adjust screws 81 and 82. The assembly was then resealed and the pressure increased to the desired level.

Figure 2:
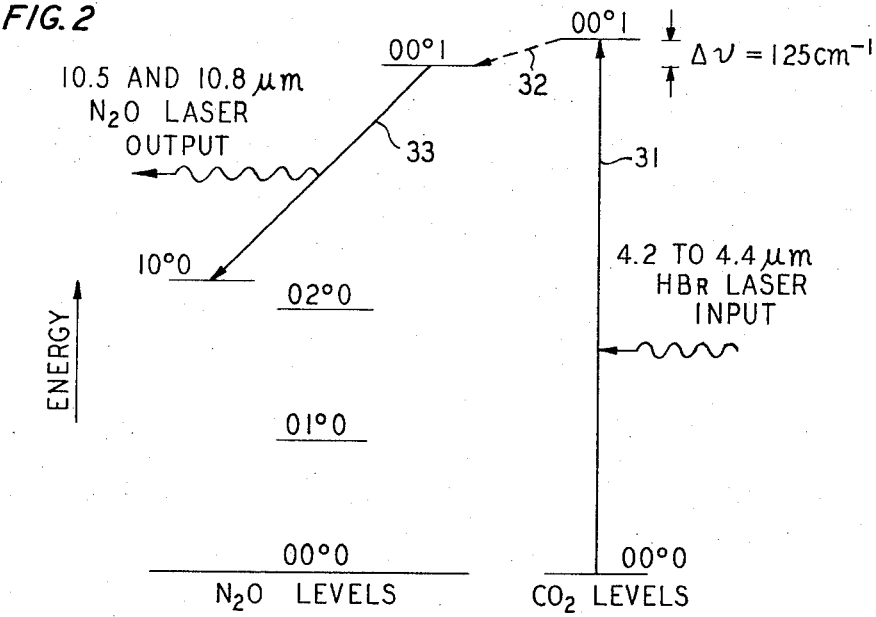
FIG. 2 shows energy level diagrams which are useful in understanding the operation of the invention.

The mechanism of energy transfer in the $N_2O-CO_2$ medium of the laser of FIG. 1 can be understood by reference to the simplified vibrational energy diagrams for the two gases shown in FIG. 2. The left hand diagram is of the $N_2O$ energy levels; and the right hand diagrams show the only two relevant $CO_2$ energy levels. Energy increases in the vertical direction. The arrow 31 represents absorption of a photon to excite a $CO_2$ molecule to its $00°1$ vibrational level. At pressures above 4 atmospheres all of the laser lines of hydrogen bromide laser 11 in the 4.2 to 4.4 $\mu$m range are strongly absorbed by the pressure-broadened vibrational-rotational absorption lines of the just described $00°0$ to $00°1$ vibrational transition within the $CO_2$ molecule.

The line segment 32 represents an energy transfer from the $00°1$ vibrational level of $CO_2$ to the like vibrational level (that is $00°1$) of $N_2O$, which is slightly lower in total energy and is not efficiently excited directly by the optical pumping radiation from laser 11. The energy transfer indicated by arrow 32 represents a vibrational-vibrational energy transfer between a molecule of excited $CO_2$ and a previously unexcited molecule of $N_2O$. Since the $00°1$ state of $N_2O$ is only 125 cm$^{-1}$ lower than the $00°1$ state of $CO_2$, vibrational energy can be exchanged by means of near-resonant collisional energy transfer. The rate constant for this process is $8 \times 10^7$ seconds$^{-1}$ atm$^{-1}$ and is much faster than the relaxation rate of the excited state of the $CO_2$, which is only $2.8 \times 10^5$ seconds$^{-1}$ atm$^{-1}$. Therefore, in a mixture of $N_2O$ and $CO_2$, the $00°1$ state of $N_2O$ can be excited indirectly and efficiently by a hydrogen bromide laser when $CO_2$ molecule acts as an intermediary. The laser action is then obtained on the $00°1 - 10°0$ transition of $N_2O$ as indicated by arrow 33 in FIG. 2.

Oscillation will not take place on the $CO_2$ potential laser transition if the ratio of $N_2O$ to $CO_2$ is sufficiently large. While all proportions have not been investigated, it is believed that the $N_2O$ must be at least substantially predominant over $CO_2$ in the mixture; that is, the ratio will be greater than one in terms of the $N_2O:CO_2$ molar ratio or partial pressure ratio. Preferably, the ratio should be greater than 5:1.

In the operation of the embodiments of FIG. 1 laser action was obtained at 10.5 $\mu$m and 10.8 $\mu$m at pressures of the gas mixture up to 42 atmospheres. The laser oscillations have been identified as originating in the $N_2O$. In contrast, direct optical pumping of pure $N_2O$ by the same hydrogen bromide laser leads to a maximum operating pressure of only 7.5 atmospheres.

In more detail, the output of the hydrogen bromide laser consisted of two 400 nanosecond pulses of roughly equal amplitude spaced 600 manoseconds apart. The maximum input energy was 21 mJ per pulse directed into the gas mixture between reflectors 72 and 73 and was limited by damage to the entrance window comprising reflector 73 of the cell 12. Reflector 73 was made of germanium; and its outside surface was not coated. The insider surface has a multiple layer dielectric coating for 97 percent reflectance at 10.6 $\mu$m to serve as the output mirror for the $N_2O$ laser resonator. Reflector 72 was 99 percent reflective and has a 5 centimeter radius of curvature. The resonator length between reflectors 72 and 73 was adjustable from about 1 millimeter to about 1 centimeter.

Figure 3:
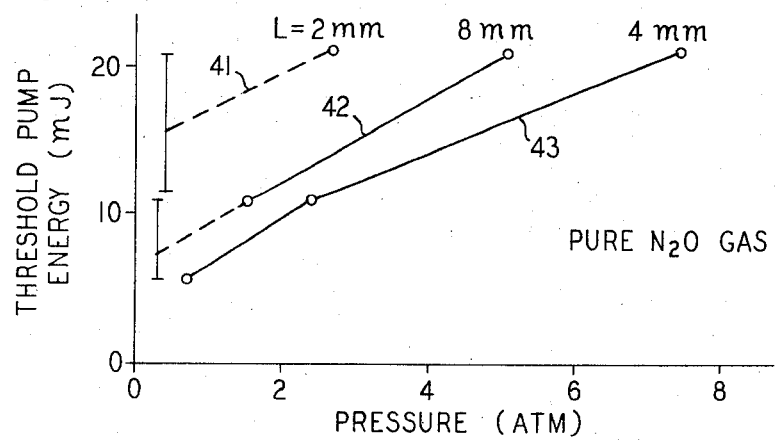
FIGS. 3 and 4 show curves which depict the operating characteristics of the invention with respect to pressure and pump power.
Figure 4:
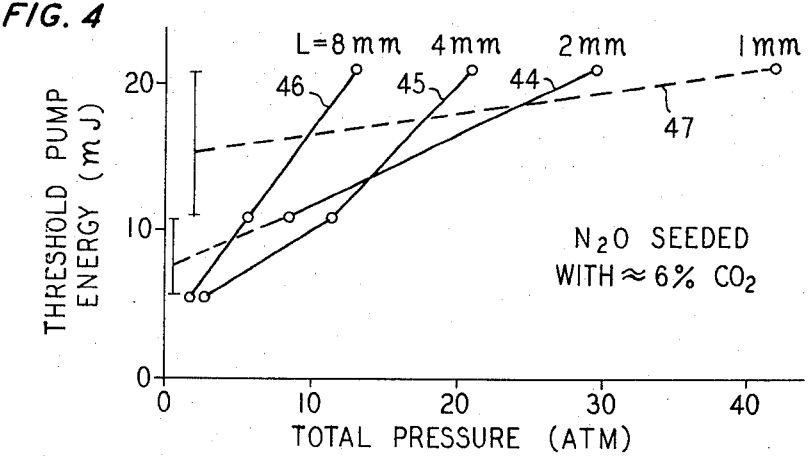

Our experimental results are summarized by the curves of FIGS. 3 and 4. In FIG. 3 curves 41, 42 and 43 give the relationship between threshold pump energy in mJ to the pressure of pure $N_2O$ gas in atmospheres for various resonator spacings (L).

For the pure $N_2O$, the optimum resonator length L is approximately 4 millimeters; and the maximum operating pressure that was achieved was about 7.5 atmospheres.

In FIG. 4 are shown similar curves 44, 45, 46 and 47 for a mixture of $N_2O$ and about 6 percent $CO_2$. The vertical and horizontal axis are essentially the same as in FIG. 2 except that the total pressure range shown is now from 0 to 42 atmospheres. The amount of $CO_2$ was found to have a broad optimum from 2 to 15 percent and appeared to be insensitive to the resonator length L. The degree of improvement in maximum operating pressure brought about by the presence of $CO_2$ increased with decreasing resonator length. The improvement is less than three-fold for L = 8 millimeters and 4 millimeters; but it is about 11-fold for L = 2 millimeters. The maximum operating pressure, 42 atmospheres was achieved with L = 1 millimeter.

In FIG. 4 it can be seen that the optimum resonator length is dependent on the total gas pressure, specifically it is 4 millimeters at 10 atmospheres, 2 millimeters at 20 atmospheres and 1 millimeter at 40 atmospheres. This result probably indicates changes in the penetration depth of the hydrogen bromide laser radiation that occurred as the gas pressure was changed.

The output of the laser of FIG. 1 appears as a single pulse approximately 600 watts peak power. The pulse width varies from 10 nanoseconds at 15 atmospheres to 7 nanoseconds at 25 atmospheres. Pulse width was not measured at 42 atmospheres. At pressures up to 17 atmospheres, the output power is randomly distributed among lines from P(12) at 10.7 $\mu$m to P(15) at 10.8 $\mu$m and from R(12) at 10.53 $\mu$m to R(18) at 10.48 $\mu$m. At pressures above 17 atm, only the R branch lines are found to oscillate. This behavior is similar to that observed in optically pumped pure $CO_2$ lasers and is believed to be due to the closer spacing of laser lines in the R branch, as compared to the P branch.

Our measurements indicated, somewhat surprisingly, that the performance of the new mixed gas molecular laser as in FIG. 1 is superior even to the performance of an optically pumped $CO_2$ laser in terms of gain and maximum operating pressure, even though $CO_2$ has a near perfect spectral match with the pumping radiation from source 11. The better performance derives from the deeper penetration depth of the pumping radiation into the active medium in the resonator.

Indeed, whenever the emitting molecular gas would have insufficient absorption as a pure gas or whenever the energy transferring $CO_2$ gas would have excessive and unsaturable absorption if present in too high a proportion, these problems are avoided in the laser of FIG.

1 by adjusting the partial pressure of the absorbing gas independent of the pressure of the active gas.

On the basis of these results, a mixture of $C^{13}O_2^{16}$ isotopic gas with less than 5 percent residual $C^{12}O_2^{16}$ is expected to be an excellent candidate for construction of a very high pressure laser according to our invention. In order to denote the similarity between this laser and the $N_2O$ laser described above we find it convenient to refer to such mixed molecule gas lasers, which are intended to be optically pumped, as optical-transfer lasers. The $C^{13}O_2^{16}$ laser will be superior to the $N_2O$ laser just described in two respects: (1) The rate constant for near-resonant energy transfer for $C^{13}O_2^{16}$ is about 15 times larger than the rate constant for $N_2O$, and (2) the matrix element for the laser transition appears to be larger in $C^{13}O_2^{16}$ than in $N_2O$. The $C^{13}O_2^{16}$ mixture is very attractive for use in liquid or solid form.

Various modifications of the laser arrangement of FIG. 1 can readily be devised. In fact, many of these modifications can be derived from the arrangements in our above cited copending patent application. For example, in FIG. 5, a mode-locked laser is readily constructed by eliminating the double pass of the pumping radiation through the medium so that a mode locking device 59 can be inserted within the laser resonator. That is, it is inserted in proximity to the high pressure cell 58, which is simpler than but constructed and sealed to high pressures like cell 12 of FIG. 1, between reflectors 56 and 57, which correspond to reflectors 72 and 73 respectively of FIG. 1. The modifications include making the input mirror 56 dichroic so that the output laser radiation from cell 58 exits only through the output mirror 57. Mirror 57 will be about 97 percent reflective and 2 percent transmissive in the laser band, but preferably more transmissive in the pumping band. The mode-locking cell 59 can be a cell including a suitable saturable absorbing dye or can be an active device such as an acousto-optic modulator. A germanium acousto-optic modulator is suitable in the range near 10 μm.

At the elevated pressures, for example 42 atm present in cell 58, the lines of the $N_2O$ laser radiation are extremely broad and facilitate the production of extremely narrow high power mode-locked pulses. This inverse relationship is now well known in the mode-locked laser art.

Figure 5:
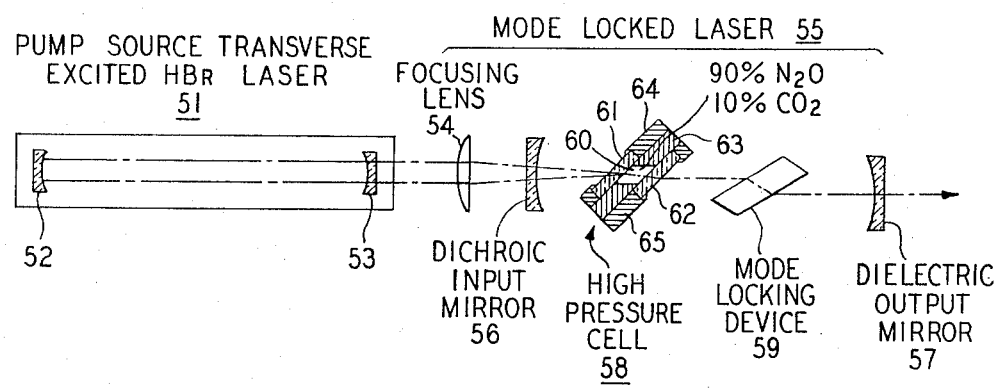
FIG. 5 is partially pictorial and partially block diagrammatic illustration of a preferred embodiment of a mode-locked laser according to our invention.

In one modification of FIG. 5, the $N_2O:CO_2$ mixture 60 is maintained in a liquid state, with the aid of cooling means (not shown) contacting cell 58. In another, cryogenic cooling maintains a solid body of the mixture 60.

Figure 6:
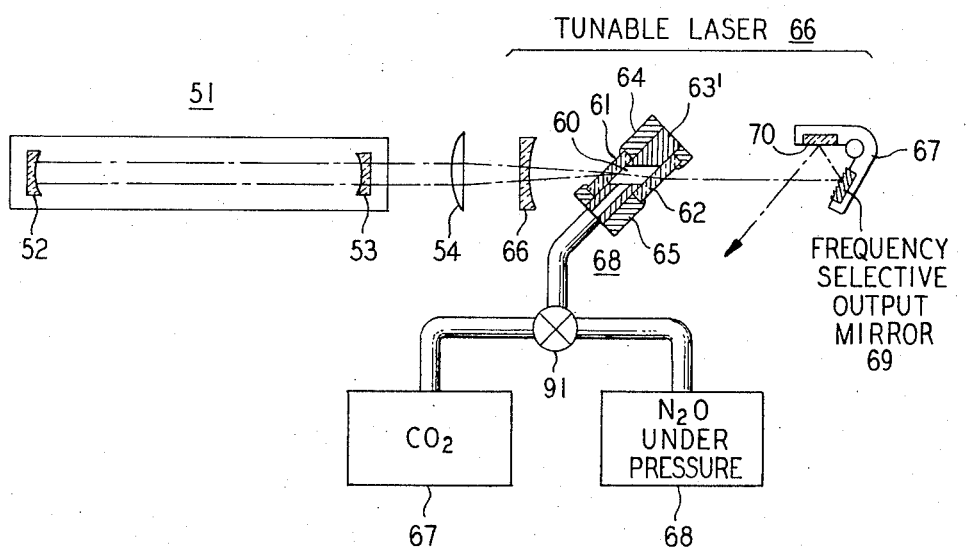
FIG. 6 shows modifications of the embodiment of FIG. 5 for the purpose of obtaining broad tunability instead of mode-locking.

A further modification is shown in the embodiment of FIG. 6. In this version advantage is taken of the overlapping of the $N_2O$ laser lines at elevated pressure, illustratively 20 atm, to produce a continuous tuning band from about 10.3 μm to about 11 μm.

For frequency selection in such a laser a rotatable diffraction grating 69 can be used. Illustratively it can be joined in an assembly 67 with a reflector 70 such that the output beam direction is substantially invariant. It will be noted that the zeroth diffracted order, a relatively small proportion of the generated coherent light, is extracted in reflector 70 for utilization.

What is claimed is:

1. Apparatus for the stimulated emission of coherent radiation comprising means for containing a mixture of $N_2O$ and $CO_2$ at pressures greater than one atmosphere, a mixture of $N_2O$ and $CO_2$ being contained in said containing means at total pressure greater than one atmosphere, the partial pressure of $N_2O$ exceeding that of $CO_2$, means for optically pumping the mixture to excite the 00°1 vibrational level of $CO_2$ sufficiently to invert the populations of a pair of vibrational-rotational levels of the $N_2O$ by vibration-vibration energy transfer from said $CO_2$ level, and means for stimulating the emission of coherent radiation from the inverted $N_2O$ levels.

2. Apparatus according to claim 1 in which the molar ratio of $N_2O:CO_2$ within the containing means is greater than 5:1.

3. Apparatus according to claim 1 in which the mixture is gaseous and the partial pressure ratio of $N_2O:CO_2$ within the containing means is greater than 5:1 and the total pressure is greater than 10 atmospheres.

4. Apparatus according to claim 3 in which the stimulating means comprises an optical resonator with an optical length not greater than about 4 millimeters, the resonator comprising multiple-layer dielectric reflectors adapted to resonate output radiations from the mixture in a wavelength band including 10.5 μm and 10.8 μm.

5. Apparatus for the stimulated emission of coherent radiation comprising means for containing a mixture of $C^{13}O_2^{16}$ and $C^{12}O_2^{16}$ at densities greater than those corresponding to a gas pressure of one atmosphere, a mixture of $C^{13}O_2^{16}$ and $C^{12}O_2^{16}$ being contained in said containing means at total pressure greater than one atmosphere, the partial pressure of $C^{13}O_2^{16}$ exceeding that of $C^{12}O_2^{16}$, means for optically pumping the mixture to excite the 00°1 vibrational energy level of $C^{12}O_2^{16}$ sufficiently to invert the populations of a pair of vibrational-rotational energy levels of the $C^{13}O_2^{16}$ by vibration-vibration energy transfer from said $C^{12}O_2^{16}$ level, and means for stimulating the emission of coherent radiation from the inverted $C^{13}O_2^{16}$ levels.

6. Apparatus according to claim 5 in which the molar ratio of $C^{13}O_2^{16}:C^{12}O_2^{16}$ within the containing means is greater than 5:1.

7. Apparatus according to claim 5 in which the mixture is gaseous and the partial pressure ratio of $C^{13}O_2^{16}:C^{12}O_2^{16}$ within the containing means is greater than 5:1.

8. Apparatus for the stimulated emission of coherent radiation comprising means for containing a mixture of two different triatomic molecules at densities greater than those corresponding to a pressure of forty atmospheres, a mixture of the two different triatomic molecules being contained in said containing means at a total density greater than that corresponding to a total pressure of forty atmospheres, one of said molecules being present at lesser density than the other, means for optically pumping the mixture to excite a vibrational level of the triatomic molecule present at lesser density than the other, said vibrational level being sufficiently excited to invert the populations of a pair of vibration-al-rotational levels of the other molecule by vibration-vibration energy transfer from the excited level of the one molecule, and means for stimulating the emission of coherent radiation from the inverted levels of the other molecule.

9. Apparatus according to claim 8 in which the mixture is liquid, many pairs of closely spaced vibrational-rotational levels are inverted in the other molecule by the vibration-vibration energy transfer from the first molecule, and the means for stimulating the emission of coherent radiation includes a resonator highly resonant in the 9 μm–11 μm range, the emissions from the inverted levels forming a continuum in that range.

10. Apparatus according to claim 9 in which the resonating means includes means for mode-locking the emissions.

* * * * *